United States Patent
Chen et al.

(10) Patent No.: US 7,091,282 B2
(45) Date of Patent: Aug. 15, 2006

(54) COMPOSITION CONTAINING ETHYLENE/PROPYLENE/DIENE COPOLYMER AND POLYALKYLENE/OLEFIN COPOLYMER

(75) Inventors: Zhong-Ren Chen, Stow, OH (US); Christine M. Rademacher, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/438,532

(22) Filed: May 15, 2003

(65) Prior Publication Data

US 2004/0230002 A1   Nov. 18, 2004

(51) Int. Cl.
  *C08L 9/00* (2006.01)
  *C08L 23/16* (2006.01)
  *C08L 31/00* (2006.01)
  *C08F 279/02* (2006.01)
  *C08K 3/26* (2006.01)

(52) U.S. Cl. ................ 525/191; 525/232; 525/240; 524/69; 524/425; 524/451; 524/525

(58) Field of Classification Search ........... 525/191, 525/232, 240; 524/69, 425, 451, 525
See application file for complete search history.

(56) References Cited

U.S. PATENT DOCUMENTS

| | | | |
|---|---|---|---|
| 4,003,420 A | | 1/1977 | Sandstrom et al. |
| 4,224,196 A | | 9/1980 | Gursky |
| 4,400,488 A | * | 8/1983 | Lal et al. .................... 525/211 |
| 4,801,641 A | | 1/1989 | Ogawa et al. |
| 4,886,850 A | | 12/1989 | Ogawa et al. |
| 4,946,881 A | | 8/1990 | Cornell et al. |
| 4,973,623 A | | 11/1990 | Haugsby et al. |
| 5,532,312 A | | 7/1996 | Gursky et al. |
| 6,037,418 A | * | 3/2000 | Mukai et al. ................ 525/242 |
| 6,201,049 B1 | | 3/2001 | Sakamoto et al. |
| 6,251,992 B1 | | 6/2001 | Sandstrom |
| 6,255,397 B1 | | 7/2001 | Sandstrom |
| 6,279,633 B1 | | 8/2001 | Corvasce |
| 6,331,360 B1 | * | 12/2001 | Sugimoto et al. ........... 428/523 |
| 6,353,054 B1 | | 3/2002 | Wang et al. |
| 6,374,889 B1 | | 4/2002 | McElrath et al. |
| 6,479,558 B1 | | 11/2002 | Fliermans |
| 6,492,475 B1 | | 12/2002 | Egashira et al. |
| 6,509,416 B1 | | 1/2003 | Ding et al. |
| 6,511,568 B1 | | 1/2003 | Eckstein et al. |
| 6,523,590 B1 | | 2/2003 | Meier et al. |
| 6,635,705 B1 | * | 10/2003 | Itoh et al. .................... 524/525 |
| 2002/0147266 A1 | | 10/2002 | Rewlinson et al. |

FOREIGN PATENT DOCUMENTS

| | | |
|---|---|---|
| GB | 2 358 022 A | 7/2001 |
| WO | WO 99/45040 | 9/1999 |
| WO | WO 02/20661 A1 | 3/2002 |
| WO | WO 03/040231 A1 | 5/2003 |
| WO | WO 2004/104083 A1 | 12/2004 |

OTHER PUBLICATIONS

International Search Report of International Application No. PCT/US02/35402 dated Mar. 11, 2003.
International Search Report of International Application No. PCT/US01/25809 dated Nov. 12, 2001.
International Search Report of International Application No. PCT/US99/04672 dated Jun. 14, 1999.
UK Patent Application No. GB 2 358 022 A dated Jul. 11, 2001.

* cited by examiner

*Primary Examiner*—Nathan M. Nutter
(74) *Attorney, Agent, or Firm*—Scott A. McCollister

(57) ABSTRACT

A composition suitable for forming a sidewall for a tire includes a rubber composition which includes at least one rubber, an ethylene/propylene/diene terpolymer, and a polyalkylene copolymer. The rubber may include one or more natural or synthetic rubbers, such as butadiene rubbers and isoprene rubbers. The ethylene/propylene/diene terpolymer preferably has an ethylene content of at least 60%. The polyalkylene copolymer may be a copolymer of a polyalkylene and an α-olefin, which is formed in a polymerization reaction involving a single site catalyst. The polyalkylene copolymer preferably has a high degree of crystallinity, being preferably at least about 90% by weight ethylene, with a melting point in the range of 80° C.–120° C. The presence of such a copolymer in the rubber composition markedly increases the resistance to crack growth and formation of cracks in the tire sidewall.

15 Claims, No Drawings

COMPOSITION CONTAINING ETHYLENE/PROPYLENE/DIENE COPOLYMER AND POLYALKYLENE/OLEFIN COPOLYMER

BACKGROUND OF THE INVENTION

1. Field of the Invention

The invention relates to a composition. In particular, it relates to a composition comprising an ethylene/propylene/diene terpolymer and a crystalline ethylene/olefin copolymer, which is suited for forming a tire sidewall, and will be described with particular reference thereto. It will be appreciated, however, that the composition has a variety of other uses, in particular, where ozone and crack resistance are sought.

2. Discussion of the Art

Rubber tires, such as pneumatic tires, include sidewalls and treads, among other components. Because of the different conditions to which these components are subjected, the composition of the sidewall is generally different from that of the tread. Sidewalls are continuously subjected to distortion under normal road operating conditions. The extensive flexing can cause the sidewalls to crack. In addition to flex cracking, sidewalls are also subjected to atmospheric chemical action such as ozone attack. The overall result is that the sidewalls are prone to erosion and degradation.

The addition of amorphous ethylene/propylene/diene (EPDM) rubber for various tire components, such as a sidewall component is known to reduce the need for antioxidants and antiozonants in the composition, primarily because of its superior resistance to ozone degradation. This results in an improved sidewall appearance. However, a disadvantage of EPDM elastomers is that they tend to have poor crack growth resistance and poor adhesion.

Various methods of improving crack growth resistance have been proposed, including the addition of precipitated silica in the presence of a silica coupling agent such as, for example, an organosilane polysulfide which contains at least about 3.5 sulfur atoms in its polysulfidic bridge (See U.S. Pat. No. 6,279,633). Addition of halobutyl rubber has been suggested to improve crack growth resistance, as disclosed, for example, in U.S. Pat. Nos. 4,224,196, 5,532,312, and 6,201,049).

The present invention provides a new and improved tire wall composition and method of preparation.

SUMMARY OF THE INVENTION

One aspect of the present invention comprises an inventive composition. The composition comprises at least one rubber, an ethylene/propylene/diene terpolymer and a polyalkylene copolymer.

In accordance with another aspect of the present invention, a sidewall for a tire is provided. The sidewall includes a rubber composition including at least one rubber, an ethylene/propylene/diene terpolymer and a polyalkylene copolymer.

Unless otherwise specified, all molecular weights are weight average molecular weights, abbreviated as "Mw".

In the description of this invention, the term "phr" is used to specify amounts of materials or ingredients in a rubber composition in terms of parts by weight of such ingredient per 100 parts by weight of elastomer (natural rubber, synthetic rubber, and EPDM are included in the term "elastomer" for purposes of these calculations).

The term "copolymer" is used to describe a polymer formed from at least two different monomers. A "terpolymer" refers to a polymer formed from at least three different monomers.

The term "rubber," as used herein, means a natural and/or synthetic rubber comprising diene and/or vinyl aromatic monomers at a concentration of at least 50% by wt.

Mooney viscosity is determined in accordance with ASTM D-1646. ML 1+4 100° C. refers to the Mooney viscosity at 100° C.

DETAILED DESCRIPTION OF THE PREFERRED EMBODIMENT

A tire sidewall formulation comprises EPDM, a polyalkylene copolymer, e.g., a polyethylene/$\alpha$-olefin copolymer and one or more natural and/or synthetic rubbers, and may comprise one or more optional tire formulation ingredients, such as fillers, such as carbon black, aromatic oils, naphthenic oils, stearic acid, sulfur, zinc oxide, and accelerators. Although the formulation is particularly suited to form the outermost layer of a tire sidewall (i.e., the part of the sidewall exposed to the atmosphere), rather than for forming inner layers of the sidewall or treads of a tire, other uses are also contemplated. The combination of EPDM with a polyethylene copolymer allows for a formulation which resists crack formation and yet has a high enough melting point that the formulation survives at relatively high temperatures, such as those encountered in warm weather conditions. The formulation can be prepared with a black coloration which matches the color of other portions of the tire.

The Polyalkylene Copolymer

The polyalkylene copolymer is preferably present in the formulation at a concentration of at least about 0.5 phr. More preferably, the polyalkylene copolymer is present in the formulation at a concentration at least about 2 phr, more preferably, at least about 3 phr. The polyalkylene copolymer concentration can be up to 20 phr, more preferably, up to about 10 phr, yet more preferably, up to about 8 phr, and, most preferably, is less than about 5 phr.

The polyalkylene copolymer is preferably a copolymer or terpolymer of a polyalkylene component and an olefin component. The olefin component can be an $\alpha$-olefin or a combination of $\alpha$-olefins. Suitable alkenes for forming the polyalkylene component include ethylene, propylene, and combinations thereof. Pure ethylene or predominantly ethylene (i.e., ethylene is at least 90% of the polyalkylene component) is preferred. The polyalkylene component is preferably present in the polyalkylene copolymer in sufficient amount to provide the copolymer with a melting point of at least 80° C., more preferably, at least about 90° C. The melting point of the polyalkylene copolymer can be up to about 120° C., more preferably, up to 110° C., most preferably, up to about 100° C. The molecular weight of the polyalkylene copolymer can be from about 10,000 to about 300,000, more preferably, at least 20,000. The melt index is generally less than 5 g/10 min, more preferably, less than 2 g/10 min, and preferably, at least 1 g/10 min.

To achieve the desired melting point, the polyalkylene component is preferably present in the polyalkylene copolymer at a concentration of at least 70% by weight, preferably, at least 80% by weight, more preferably, at least 85%, and most preferably, at least 90% by weight. Comonomers are thus present at less than 30% by weight, preferably, less than 20%, more preferably, less than 10% by weight. The polyalkylene component can be present in the polyalkylene copolymer at a concentration of up to 99% by weight, more preferably, less than about 95% by weight. In one particular embodiment, the polyalkylene copolymer has a high degree of crystallinity, which fosters physical crosslinking with the EPDM. Suitable α-olefins for forming the copolymer include $C_3$–$C_{20}$ α-olefins, more preferably, $C_4$–$C_{12}$ α-olefins, most preferably, $C_4$–$C_6$ α-olefins. Exemplary α-olefins include, but are not limited to propylene, 1-butene, 1-pentene, 4-methyl-1-pentene, 1-hexane, 1-octene, 1-decene, 1-dodecene, and combinations thereof. A preferred α-olefin comonomer is 1-butene.

Specific examples of the monomers which constitute suitable polyalkylene copolymers include the combinations of ethylene and 1-butene, ethylene and 1-hexene, and propylene and 1-butene.

Copolymers of ethylene and/or propylene and α-olefins that have been formed by a polymerization reaction in the presence of a single site catalyst, such as a metallocene, are particularly suitable, although copolymers formed with Ziegler catalysts are also contemplated. A preferred polymer formed by a single site catalyst is a copolymer of ethylene and an alpha olefin such as 1-butene, preferably a linear ethylene 1-butene copolymer. When the α-olefin is present in the copolymer in the range of about 10 to 30% by weight, these copolymers are referred to as plastomers. Polymers of this type are obtainable from Exxon Chemical Americas of Houston, Tex. as EXACT PLASTOMERS, such as EXACT 3125, 3128, 0203, 3035, 4011, and SLX 9017.

A metallocene is a complex organometallic molecule typically containing zirconium, titanium, or hafnium, with a pair of cyclic alkyl molecules. Metallocene catalysts are usually compounds with one or two cyclopentadiene rings fixed to the metal, such as cyclo-pentadienyl titanium complexes. These catalysts are frequently used with aluminoxanes as a co-catalyst or an activator. One suitable aluminoxane is a polymethylaluminoxane (MAO).

While not wanting to be bound by theory, it is believed that the metallocene, single site catalyst confines the copolymerization reaction to a single site over the polymer thus controlling comonomer placement and side chain length and branching. The copolymers formed from metallocene single site catalysts are highly stereo regular products with narrow molecular weight distribution. The metallocene single site catalysts are capable of producing isotactic polymers and syndiotactic polymers, i.e., polymers in which the crystalline branches alternate regularly on both sides of the backbone of the polymer. Nonstereoselective catalysts have been developed by Exxon and Dow and are used to make Exxon's Exact resins and Dow's CGCT resins.

In one embodiment, the polyalkylene/olefin copolymer is substantially free of mer units derived from monomers having more than one double bond (e.g., dienes). In one embodiment, no more than 1% of the mer units are derived from monomers having more than one double bond.

The presence of polyalkylene/olefin copolymer in the tire wall formulation results in a much higher crack resistance than is found in conventional compositions.

The EPDM

EPDM is the ASTM designation for a terpolymer of ethylene, propylene and a non-conjugated diolefin. The EPDM is preferably present in the formulation at a concentration of at least 20 phr, more preferably, at least 30 phr. The EPDM can be present at a concentration of up to 60 phr, more preferably, up to about 40 phr. The ratio of polyalkylene copolymer to EPDM by weight in the tire wall formulation is preferably from 1:4 to 1:20, more preferably, from about 1:6 to 1:10.

In EPDM terpolymers, the ethylene and propylene form a fully saturate backbone of methylene linkages with the non-conjugated diolefin, e.g., dicyclopentadiene or substituted norbornene, attached so as to provide unsaturated side chains with readily available crosslinking sites for sulfur curing. The EPDM elastomers thus contain a fully saturated backbone which provides outstanding resistance to oxidation, ozone, and cracking, as well as excellent low temperature flexibility. EPDM elastomers are typically formed using Ziegler/Natta type catalysts. The ethylene content of the EPDM is preferably at least 60% by weight, more preferably, at least 70% by weight. The ethylene content of the EPDM can be up to about 85%, more preferably, less than about 80% by weight. The total diene monomer content in the EPDM may suitably range from about 2 to about 15% by weight.

The non-conjugated dienes may be straight chain or cyclic hydrocarbon diolefins having from 6 to 15 carbon atoms, such as dicyclopentadiene, including 5-methylene-2-norbornene, 5-vinyl-2-norbornene, 2-methylnorbornadiene, 2,4-dimethyl-2,7-octadiene, 1,4-hexadiene, 5-ethylidene-2-norbornene, dicyclopentadiene, and combinations thereof. Exemplary EPDM terpolymers are commercially available from Uniroyal Chemical, Division of Crompton Corporation of Middlebury, Conn., as ROYALENE 551 and 552.

The EPDM can be crystalline or amorphous. Crystalline EPDM's generally have an ethylene content of at least about 70%, and are particularly preferred.

The Rubber

The highly unsaturated rubbers which are suited to use in the present formulation can be selected from the group consisting of natural rubbers, such as natural cis 1,4-polyisoprene rubber, and synthetic rubbers, such as polyisoprene rubbers, styrene butadiene rubber (SBR), polybutadiene rubber, and mixtures thereof. The rubber content (i.e., total of natural or synthetic rubbers) of the formulation may be from about 30 to about 78 phr.

The Mooney viscosity of the polybutadiene rubber as measured at 100° C. (ML 1+4 100° C.) may range from about 30 to about 70, more preferably about 40 to about 60, and most preferably about 45 to about 50. When both natural rubber and polybutadiene rubber are used, ranges from about 100 to 1 to 1 to 100, more preferably 5 to 1 to 1 to 5 are suggested. One exemplary formulation includes cis-polybutadiene rubber and natural rubber in a ratio of about 2:1. Suitable rubbers are obtained from Japan Synthetic Rubber or Firestone Polymers.

Other Additives

As noted above, one or more conventional tire formulation ingredients, such as fillers, such as carbon black or titanium dioxide for pigmentation reinforcing fillers such as silica. Processing aids, such as aromatic and naphthenic oils and waxes, resins, including tackifying resins, plasticizers, fatty acids, such as stearic acid, may also be present. Peptizing agents, curing aids, such as zinc oxide, vulcanizing agents, accelerators, retarders, and other additives such as antioxidants and antiozonants, may also be present in the tire sidewall composition. Suitable vulcanizing agents include sulfur, sulfur chloride, sulfur dichloride, morpholine disulfide, an alkylphenol disulfide, tetramethyl-thiuram disulfide and selenium dimethyldithio-carbamate.

Small amounts of pure polyethylene and polypropylene, which have melting points in the range of 170° C., may be present in the formulation.

These ingredients may be present in conventional amounts, as known in the art. For example carbon black may be present at about 30–55 phr, stearic acid may be present at about 0.5–4 phr, aromatic and/or naphthenic oils at about 1–50 phr, zinc oxide at about 2–5 phr, and accelerators at about 0.1–1.0 phr.

Compounding

The tire sidewall composition and layers of the present invention can be compounded by methods generally known in the art, such as by mixing the uncured polymers with the various fillers, process oils, curing aids, accelerators, retarders, and other additives, such as antioxidants and antiozonants.

The rubber composition for the tire sidewall may be prepared, for example, by mixing the ingredients in several sequential stages (without the sulfur and associated accelerator(s) curatives together with antidegradant(s)) to temperatures of about 150–170° C., followed by a final productive (with the sulfur curative) mixing stage to a temperature of about 100–115° C., in which the curatives and antidegradants are added. An internal rubber mixer (e.g., Banbury™ or Brabender™ type) is typically used.

In a preferred embodiment, a first mixing stage includes combining the EPDM and polyalkylene copolymer, optionally with some of the aromatic oil and carbon black, but without the rubber components. These ingredients are mechanically combined in the mixer at a suitable temperature, such as from about 140–170° C., more preferably, about 160° C., for sufficient time to ensure adequate mixing, e.g., from about 3 to 10 minutes. This ensures thorough mixing between the EPDM and the polyalkylene copolymer. The combined mixture may be dumped from the mixer, allowed to cool, and remilled. The remilled mixture is reintroduced to the mixer, together with the remaining ingredients, except for the curative (sulfur, zinc oxide, and accelerators) for a second mixing stage. This stage includes heating the ingredients to a suitable temperature, such as from about 150–170° C., more preferably, about 160° C., and for sufficient time to ensure thorough mixing, e.g., from about 3 to 10 minutes. The mixture may be dumped from the mixer, and cooled. In the final mixing stage, the sulfur curative is added to the remilled mixture. This stage may take place at a temperature of about 100° C. (i.e., below the vulcanizing temperature). In some mixers, it may not be necessary to dump the mixture from the mixer before beginning the next stage.

The first stage of mixing causes the polyalkylene copolymer to disperse throughout the EPDM. Under an electron microscope, the polyalkylene copolymer appears as small droplets dispersed in the EPDM. The blending of these two components produces a shift in the melting points. For example, the melting point of ROYALENE 552, as measured by DSC, increases from 38.5° C., prior to mixing, to 40.6° C., after mixing, and the melting point of Exact 3128 drops from 96.7° C., prior to mixing, to 91.3° C., after mixing. This is caused by cocrystallization of the polyalkylene copolymer with the EPDM, which provides physical crosslinking.

The resulting rubber compounds may then be extruded to form components such as, for example, sidewall or colored rubber strips which, in turn, may be built onto a tire carcass and the resulting assembly vulcanized using heat or light or other suitable vulcanizing process, in a suitable mold form a tire, for example, at a temperature of about 170° C. For example, a tire may be built on a drum from at least three layers, namely, an outer layer comprising a tread portion and sidewalls, an intermediate layer, and an inner liner, the sidewalls comprising at least an outer layer of the formulation this invention. After the uncured tire has been built on a building drum, the uncured tire may be placed in a heated mold to shape it and heat it to vulcanization temperatures and, thereby, to produce a cured unitary tire from the multi-layers.

The single-layer or multi-layered tire sidewall of the present invention may be used as the sidewall for motor vehicle pneumatic tires such as truck tires, bus tires, passenger automobile tires, and motorcycle tires.

The resulting cured tire sidewall formulation has a crack growth resistance which can be from 2 to 20 times that of a conventional tire sidewall formulation, at room temperature (20–25° C.). At 50–60° C., the crack growth resistance can be 2 to 5 times that of the conventional formulation. This high temperature crack growth resistance is particular important when the ambient temperature is high (e.g., above about 30° C.) when the tire sidewall temperature can easily reach 50° C. during motion of the vehicle. Ozone resistance is generally at least as good, or better than conventional formulations. The ozone resistance may be 2 to 5 times greater than in conventional formulations. Other mechanical properties are at least as good as, and generally better than those of a conventional formulation. For example dynamic strain (G') and tensile strength are generally increased. The formulation generally has a lower tan delta, which reduces rolling resistance. The formulation has also been shown to exhibit good aging resistance.

In one specific embodiment of the invention, a sidewall for a tire includes a rubber composition including at least one rubber, an ethylene/propylene/diene terpolymer and a polyalkylene copolymer. In one aspect of this embodiment, the rubber composition comprises, based on 100 parts by weight elastomer (phr): about 30 to about 40 phr of the ethylene/propylene/diene terpolymer and about 3 to about 5 phr of the polyalkylene copolymer.

In another specific embodiment of the invention, a formulation suited to formation of a tire sidewall includes, based on 100 parts by weight elastomer (phr), 20–60 phr of an ethylene/propylene/diene terpolymer, 2–10 phr of a polyalkylene copolymer having a melting point of from 80° C. to 120° C., 30–78 phr of one or more of natural and synthetic rubbers; and optionally one or more of a filler, a vulcanizing agent, and a processing aid.

In another specific embodiment of the invention, a method of formulating a composition suitable for forming a tire sidewall is provided. The method includes mixing an ethylene/propylene/diene terpolymer with a copolymer for sufficient time to form a first blend, the copolymer comprising a copolymer of a polyalkylene and an α-olefin, the copolymer having a melting point of 80° C.–120° C. The first blend is combined with one or more of natural rubbers and synthetic rubbers and optionally one or more of processing aids and fillers to form a second blend.

In another specific embodiment, a rubber composition includes at least one rubber, an ethylene/propylene/diene terpolymer having an ethylene content of at least 60%, and a polyalkylene/α olefin copolymer having a melting point of 80° C. to 120° C. This composition is suited to both forming tire sidewalls and also in other applications where crack growth resistance is desired.

The following examples are provided to illustrate the present invention. The examples are not intended to limit the scope of the present invention and they should not be so interpreted. Amounts are in weight parts or weight percentages unless otherwise indicated.

EXAMPLES

Test Methods

The following test methods were used throughout:

Mooney viscosity of rubbers is determined in accordance with ASTM D-1646. ML 1+4 refers to Mooney viscosity at a specific set of conditions and at a specified temperature, e.g., ML 1+4 100° C. refers to the Mooney viscosity at a temperature of 100° C. Compound Mooney ML 1+4 130° C. refers to Mooney viscosity at a specific set of conditions and at 130° C., and is usually used for uncured compounds.

Tensile mechanical properties are measured by using the procedure described in ASTM-D 412 at 23° C. The tensile test specimens are round rings 0.127 cm in width and 0.190 cm in thickness. The rings are notched at two places on the inner circumference of the ring at equidistant locations. A specific gauge length of 2.54 cm is used for the tensile tests.

Tear strengths of the vulcanized stocks are measured by using the procedure set forth in ASTM-D 624 at 23° C. The test specimens employed are round rings of 44 mm and 57.5 mm in inside and outside diameters, respectively. The rings were nicked at two points on their inside circumference, the nicks having dimensions of 6.35 mm in width and 2.54 mm in thickness. These specimens are tested at a specific gauge length of 4.345 cm.

The resulting vulcanizates are tested for hysteresis loss as measured by tan delta (δ). The tan delta (δ) values are obtained by using a Rheometrics ARES rheometer following the Dynamic-Temperature-Step-Test procedure. The test specimens used for this sweep test are rectangular slabs with dimensions of 0.127 cm in width, 2.667 cm in length, and 0.254 cm in thickness. The following test conditions are employed: frequency 31.4 rad/sec, strain of 0.2 percent for the temperature range from −70° C. to −10° C., and a strain of 2 percent for the temperature range from −10° C. to 100° C.

Crack Growth Rate (Dc/Dn): cut growth rate is measured in a "pure shear" geometry with a precut using the method of Lake, G. J., *Rubber Chemistry and Technology*, 68: (3), 435–460, 1995). The testing sheet has a length of 20.32 cm, a height of 64.5 mm and a thickness of 2 mm. A pre-cut of 4.0 cm is performed along the length direction. Cyclic deformation is applied along the height direction with a strain amplitude of 2.5% to 25%, and with a frequency of 1 to 100 Hz. The deformation waves are sinusoidal waves, half-sinusoidal waves, square waves, or a combination of all of them. A typical testing condition is a 40 Hz half-sinusoidal pulse for a 5 Hz deformation cycle under 10% strain amplitude at desired temperatures (23° C.–80° C.). Images of the propagating crack are recorded automatically at a given interval of cyclic deformation, usually 10,000 cycles. Crack growth rate (dc/dn) is then calculated from the increment of crack length at each cycle (nm/cycles). To provide a better correlation of this dc/dn test with the actual crack growth rate during tire use, crack growth rate is then converted to a value at a given tearing energy (T) or at a given load (or stress). The definitions and calculation of tearing energy (T) or energy release rate (G), are well known. The power factor m (or β), which relates crack growth rate dc/dn to tearing energy T in a power-law equation, has values from 1.5 to 4, depending on the composition of the rubber compounds. For the present sidewall composition, the value of m is estimated as 3.0 [Young D G, *Rubber Chemistry and Technology*, 63: (3), 567–581, 1990]

Example 1

Formulations 1 and 2 were prepared using the ingredients listed in Table 1. ROYALENE 552 was used as the crystalline EPDM. ExxonMobil Exact Plastomer, EXACT 3125, was as the polyalkylene copolymer in Formulation 2 to replace a portion of the EPDM. Cis-butadiene rubber was obtained from Japan Synthetic Rubber. Altax-MBTS, DPG, and TBBS were used as accelerators.

TABLE 1

|  | Formulation | |
| --- | --- | --- |
|  | 1 (phr) | 2 (phr) |
| Royalene 552 | 40 | 36 |
| Exact 3125 | 0 | 4 |
| cis-butadiene rubber | 40 | 40 |
| Natural rubber | 20 | 20 |
| Carbon Black | 50 | 50 |
| Aromatic Oil | 17 | 17 |
| Stearic Acid | 2 | 2 |
| Sulfur | 1.50 | 1.50 |
| Zinc Oxide | 3 | 3 |
| Accelerators, total | 0.5 | 0.5 |

In a first mixing stage, pellets of polyalkylene copolymer and EPDM, and a portion of the aromatic oil and carbon black were blended in a Brabender™ mixer at 60 rpm for 5 minutes. The start temperature was 100° C. A temperature of 160° C. was reached. The blend was dumped from the mixer, allowed to cool, and remilled. The blend was reintroduced to the mixer along with other ingredients, except for the curatives (sulfur, zinc oxide, and accelerators) and mixed at 60 rpm for 5 minutes. The start temperature was 100° C. A temperature of 160° C. was reached. The blend was dumped from the mixer and allowed to cool. In a final mixing stage, the remilled blend formed in the second stage was blended at 40 rpm for two minutes, together with the sulfur, zinc oxide, and accelerators. The start temperature was 70° C. A temperature of 100° C. was reached.

Processing characteristics of Formulation 2 were comparable to those of an EPDM/rubber formulation without the polyalkylene copolymer (Formulation 1). For example, ML 1+4 130° C. is 41.3 and 41.4, for Formulations 1 and 2, respectively. T90, which characterizes the curing rate, is also very similar. T90 values of 5.42 and 5.45 minutes were obtained for Formulations 1 and 2, respectively.

Strips of the resultant formulation were molded and cured at 171° C. for 15 minutes. The results of tests performed on the strips are shown in Tables 2 and 3. These include mechanical properties for the strips formed from the two formulations, such as tensile strength, dynamic mechanical properties, and cut growth rate.

TABLE 2

|  | Formulation | |
| --- | --- | --- |
|  | 1 | 2 |
| 100% Modulus at 23° C. (MPa) | 1.94 | 1.94 |
| Tensile Strength at Break at 23° C. (MPa) | 14.6 | 14.3 |
| Tear Strength at 23° C. (lb/in) | 350 | 489 |

TABLE 2-continued

| | Formulation | |
|---|---|---|
| | 1 | 2 |
| Travel at Tear (%) | 470 | 606 |
| Dynamic Modulus G' at 50° C., 31.4 rad/s, @ 5% strain (MPa) | 2.06 | 2.38 |
| Tan δ at 50° C. | 0.174 | 0.164 |

TABLE 3

| | Stock | |
|---|---|---|
| | 1 | 2 |
| Cut growth rate (dc/dn) at 60° C. (nm/cycle) | 122 | 71.7 |
| Tear Energy (J/m$^2$) | 1220 | 1450 |
| Dc/dn at equal tear energy (T = 1200 J/m$^2$) | 120 | 41 |

As seen in Table 2, tensile strength and modulus are comparable, while tear strength and travel at tear are significantly higher for Formulation 2. Dynamic modulus G' is higher and tan δ is lower for Formulation 2.

Cut growth rate measurements at 60° C. for the two formulations shown in Table 3 demonstrate the improved results for Formulation 2, which is about half that of Formulation 1. When the differences in tearing energy (T) are taken into account, the difference is even greater, with the cut growth rate of Formulation 2 being about one third of that of Formulation 1.

Example 2

Six formulations, labeled 3–8 were compounded according to the method described for Example 1. Table 4 lists the ingredients for each of these formulations. Formulations 3–6 were for comparison purposes and formulations 7 and 8 were formed according to the present invention. Formulation 3 contained neither EPDM nor a polyalkylene copolymer. Formulation 4 included EP35 (Japan Synthetic Rubber), which is an amorphous EPDM, comprising 50% ethylene, and was also formulated without polyalkylene copolymer. Formulations 5 and 6 were similar formulations: both included a crystalline EPDM (ROYALENE 552), but no polyalkylene copolymer. Altax-MBTS, DPG, and TBBS were used as accelerators.

TABLE 4

| | Formulation | | | | | |
|---|---|---|---|---|---|---|
| | 3 (phr) | 4 (phr) | 5 (phr) | 6 (phr) | 7 (phr) | 8 (phr) |
| Royalene 552 | | | 40 | 40 | 40 | 40 |
| Exact 3128 | | | | | 4 | 4 |
| JSR EP35 | | 40 | | | | |
| cis-butadiene rubber | 60 | 40 | 40 | 40 | 40 | 40 |
| Natural rubber | 40 | 20 | 20 | 20 | 20 | 20 |
| Carbon Black | 55 | 50 | 43 | 41 | 41 | 39 |
| Aromatic Oil | 13 | 17 | 17 | 17 | 17 | 17 |
| Stearic Acid | 1.5 | 2 | 2 | 2 | 2 | 2 |
| Sulfur | 1.5 | 1.5 | 1.5 | 1.5 | 1.5 | 1.5 |
| Zinc Oxide | 2.5 | 3 | 3 | 3 | 3 | 3 |
| Accelerators, total | 0.8 | 0.5 | 0.5 | 0.5 | 0.5 | 0.5 |

Table 5 provides the processing characteristics of these formulations and the mechanical and other properties after curing. Table 6 provides cut growth rates for rings formed from the cured compositions and Table 7 shows the cut growth rates after aging for 80° C. in air.

Compounds containing crystalline EPDM (formulations 5–8) have greater modulus, tensile strength, elongation at break, and dynamic moduli than the compound with amorphous EPDM (formulation 4). In addition, compounds containing crystalline EPDM (formulations 5–8) have lower hysteresis (tan δ at 50° C.).

TABLE 5

| | Formulation | | | | | |
|---|---|---|---|---|---|---|
| | 3 | 4 | 5 | 6 | 7 | 8 |
| ML1 + 4, 130° C. | 34.7 | 35.4 | 33.1 | 32.3 | 31.4 | 30.5 |
| 100% Modulus at 23° C. (MPa) | 1.43 | 1.39 | 1.77 | 1.79 | 1.87 | 1.68 |
| Tensile Strength at Break at 23° C. (MPa) | 13.9 | 9.9 | 15.0 | 15.5 | 15.6 | 14.7 |
| Elongation at Break at 23° C. (MPa) | 612 | 619 | 708 | 715 | 695 | 722 |
| Dynamic Modulus G' at 50° C., 31.4 rad/s, @ 5% strain (MPa) | 1.41 | 1.68 | 1.64 | 1.68 | 1.98 | 1.99 |
| Tan δ at 50° C. | 0.141 | 0.174 | 0.155 | 0.153 | 0.137 | 0.135 |

Among other benefits of adding plastomer in a crystalline EPDM formulation (Formulations 7 and 8) is the reduced cut growth rate, as shown in Table 6. The difference was particularly noticeable after aging at 80° C. for five days in air (Table 7).

TABLE 6

| | Formulation | | | | | |
|---|---|---|---|---|---|---|
| | 3 | 4 | 5 | 6 | 7 | 8 |
| Cut growth rate (dc/dn) at 50° C. (nm/cycle) (without aging) | 47.5 | 82 | 23.8 | 26.4 | 16.8 | 17.6 |
| Tear Energy (J/m$^2$) | 1190 | 1220 | 1400 | 1510 | 1590 | 1420 |
| dc/dn @ equal T (1200 J/m$^2$) | 48.7 | 78.0 | 15.0 | 13.3 | 7.2 | 10.2 |

TABLE 7

| | Formulation | | | | | |
|---|---|---|---|---|---|---|
| | 3 | 4 | 5 | 6 | 7 | 8 |
| Cut growth rate (dc/dn) at 50° C. (nm/cycle) after aging | 487 | 210 | 346 | 266 | 97.4 | 89.7 |
| Tear Energy (J/m$^2$) | 1697 | 1570 | 1560 | 1480 | 1640 | 1640 |
| dc/dn @ equal T (1200 J/m$^2$) | 172 | 93.8 | 157 | 142 | 38.2 | 35.1 |

Dynamic ozone resistance of stocks is performed in an ozone chamber and dynamic deformation is applied. Samples have a cross section of 0.127 cm and 0.190 cm. Days or hours to break are recorded to compare the ozone resistance. Table 8 shows the results obtained. At both −1° C. and 27° C., stocks 7 and 8 have a longer lifetime than stocks 4, 5, and 6. All EPDM-based compounds (stocks 4–8) have better ozone resistance than Formulation 3.

TABLE 8

| | Stock | | | | | |
|---|---|---|---|---|---|---|
| | 3 | 4 | 5 | 6 | 7 | 8 |
| Days to break at −1° C. | <1 | 3 | 4 | 3 | >4 | >4 |
| Days to break at 27° C. | <1 | >2 | >2 | >2 | >2 | >2 |

Dynamic ozone resistance of the inventive formulations 7 and 8 were comparable to that obtained for those formulations using crystalline EPDM (formulations 5 and 6), and better than those without the crystalline EPDM (formulations 3 and 4).

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A tire having a sidewall, the sidewall including a rubber composition formulated so as to comprise:
   at least one rubber;
   an ethylene/propylene/diene terpolymer which has an ethylene content of at least 60% by weight; and
   a polyalkylene copolymer having a melting point of from 90° C. to less than about 120° C.

2. The tire of claim 1, wherein the polyalkylene copolymer comprises a polyalkylene component and an α-olefin component.

3. The tire of claim 2, w-herein the polyalkylene component includes mer units of at least one of ethylene and propylene.

4. The tire of claim 2, wherein the polyalkylene copolymer comprises a polyethylene component and an α-olefin component.

5. The tire of claim 1, wherein the polyalkylene copolymer has a polyalkylene component content of at least 70%.

6. The tire of claim 1, wherein the polyalkylene copolymer has an alkylene content of at least 85%.

7. The tire of claim 2, wherein the α-olefin comprises a $C_4$–$C_{12}$ olefin.

8. The tire of claim 7, wherein the α-olefin is at least one of 1-butene, 1-pentene, 4-methyl-1-pentene, 1-hexane, 1-octene, 1-decene, and 1-dodecene.

9. A tire including a rubber composition formulated so as to comprise, based on 100 parts by weight elastomer (phr):
   30–70 phr rubber;
   about 20 to about 60 phr of an ethylene/propylene/diene terpolymer; and
   about 2 to about 10 phr of a polyalkylene copolymer.

10. The tire of claim 1, wherein the rubber includes one or more of natural and synthetic rubbers selected from the group consisting of butadiene rubbers, polyisoprene rubbers, styrene-butadiene rubbers, and mixtures thereof.

11. The tire of claim 1, wherein the rubber composition further includes one or more of:
   fillers;
   vulcanizing agents; and
   processing aids.

12. The tire of claim 1, wherein the polyalkylene copolymer is substantially free of mer units having multiple double bonds.

13. A method of formulating a composition suitable for forming a tire sidewall comprising:
   mixing an ethylene/propylene/diene terpolymer which has an ethylene content of at least 60% by weight with a copolymer for sufficient time to form a first blend, the copolymer comprising a copolymer of a polyalkylene and an α-olefin, the copolymer having a melting point of 90° C.–120° C.;
   combining the first blend with at least one of the group consisting of natural rubbers and synthetic rubbers and optionally at least one of the group consisting of processing aids and fillers to form a second blend.

14. The method of claim 13, wherein the method further includes:
   forming the copolymer by a polymerization reaction in the presence of a single site catalyst.

15. A composition comprising:
   at least one rubber;
   an ethylene/propylene/diene terpolymer which has an ethylene content of 60–80% by weight; and
   a polyalkylene-α-olefin copolymer having a molecular weight of about 10,000 to about 300,000, a melting point of from 90° C. to less than about 120° C., and an ethylene content of at least 70%, the polyalkylene-α-olefin and ethylene/propylene/diene terpolymer being present in a weight ratio of from 1:4 to 1:20.

* * * * *